United States Patent [19]

Radkowsky

[11] Patent Number: 4,678,619

[45] Date of Patent: Jul. 7, 1987

[54] NUCLEAR REACTOR

[75] Inventor: Alvin Radkowsky, Ramat Gan, Israel

[73] Assignee: Kernforschungszentrum Karlsruhe GmbH, Karlsruhe, Fed. Rep. of Germany

[21] Appl. No.: 37,400

[22] Filed: May 7, 1979

[30] Foreign Application Priority Data

May 4, 1978 [DE] Fed. Rep. of Germany ....... 2819734

[51] Int. Cl.$^4$ .......................... G21C 1/00; G21C 3/58
[52] U.S. Cl. .................................... 376/173; 376/346; 376/901
[58] Field of Search ............................ 176/17, 18, 40; 376/173, 346, 901

[56] References Cited

U.S. PATENT DOCUMENTS

| | | | |
|---|---|---|---|
| 2,969,311 | 1/1961 | Wigner et al. | 176/18 |
| 3,140,237 | 7/1964 | Peterson et al. | 176/18 |
| 3,154,471 | 10/1964 | Radkowsky | 176/40 |
| 3,211,621 | 10/1965 | Creagan | 176/18 |
| 3,247,068 | 4/1966 | Schluderberg et al. | 176/40 |
| 3,844,886 | 10/1974 | Crowther | 176/17 |
| 3,859,165 | 1/1975 | Radkowsky et al. | 176/40 |
| 3,998,692 | 12/1976 | Bohanan et al. | 176/18 |

Primary Examiner—Harvey E. Behrend
Attorney, Agent, or Firm—Spencer & Frank

[57] ABSTRACT

In a water-cooled nuclear reactor for producing energy and having seed and blanket zones, which reactor is cooled by pressurized water and contains fissile material of plutonium and uranium, the reactor is provided, in its seed zones and blanket zones, with a plutonium composition such as obtained from light water power plant reactors after a normal service life and recycle, and with fuel elements whose geometry in the seed and blanket zones, with respect to the coolant water, is selected to produce an epithermal neutron spectrum.

1 Claim, 14 Drawing Figures

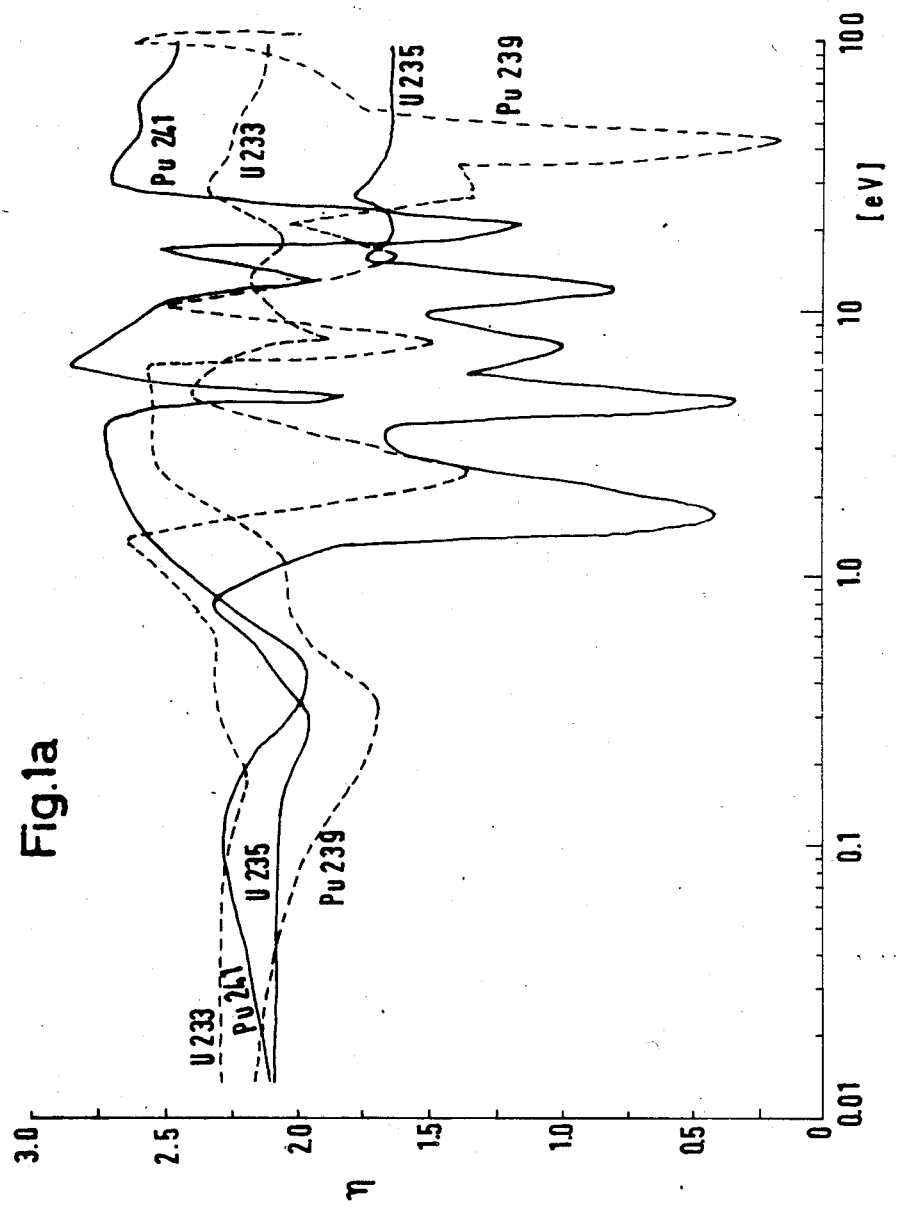

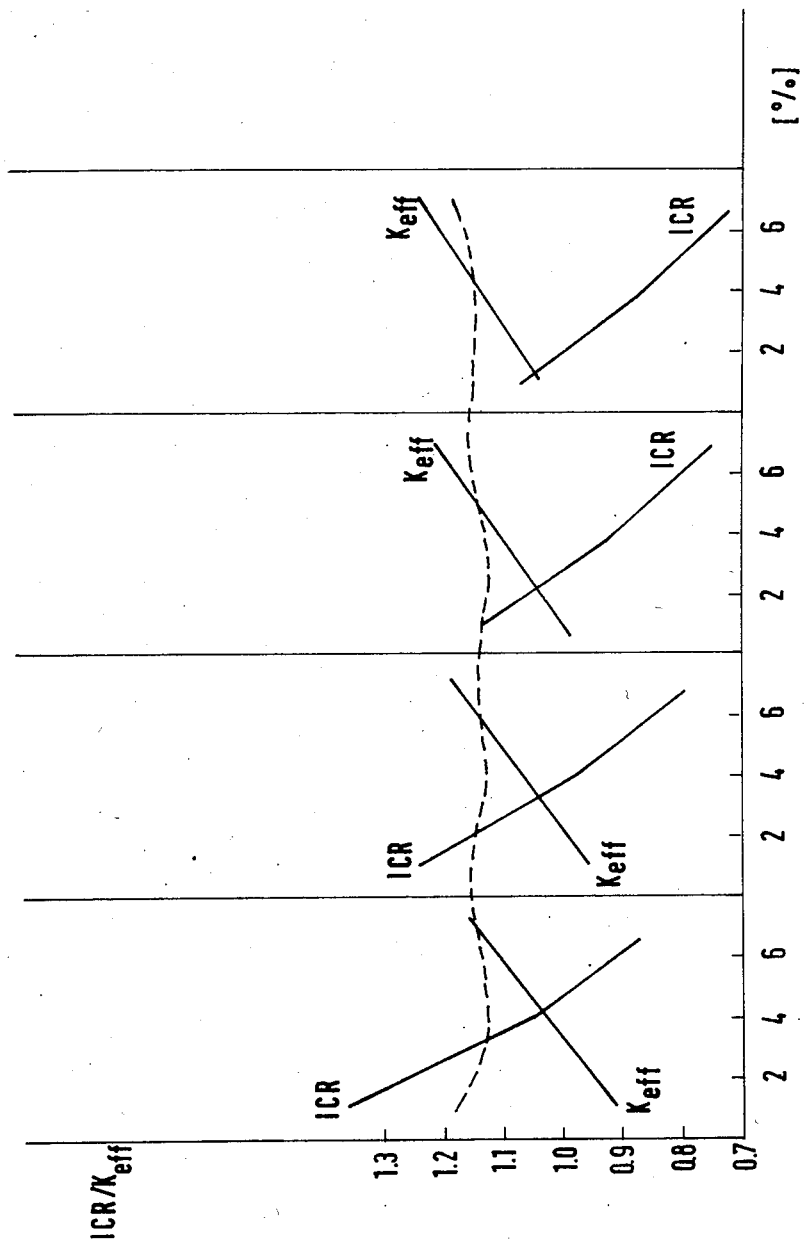

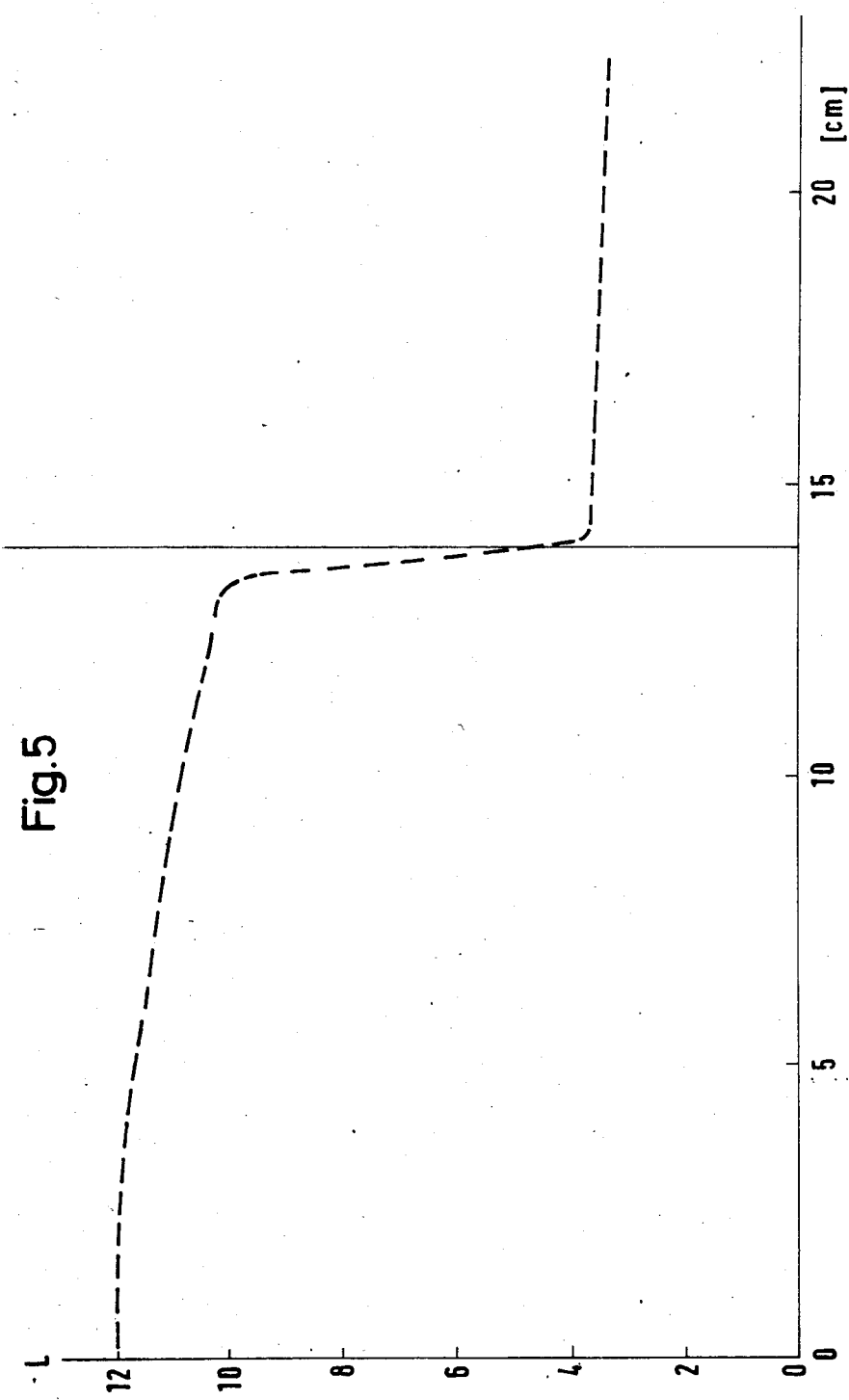

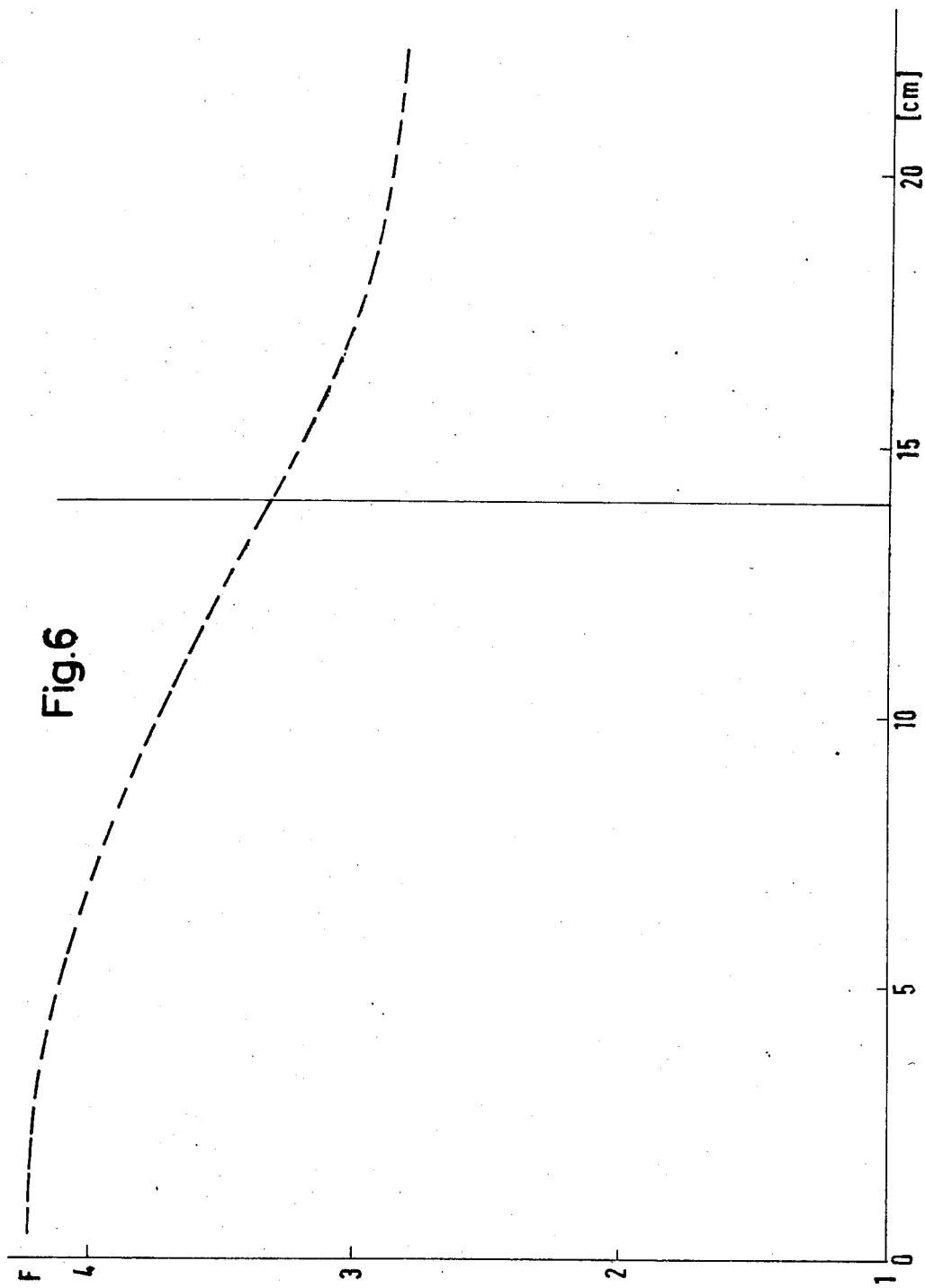

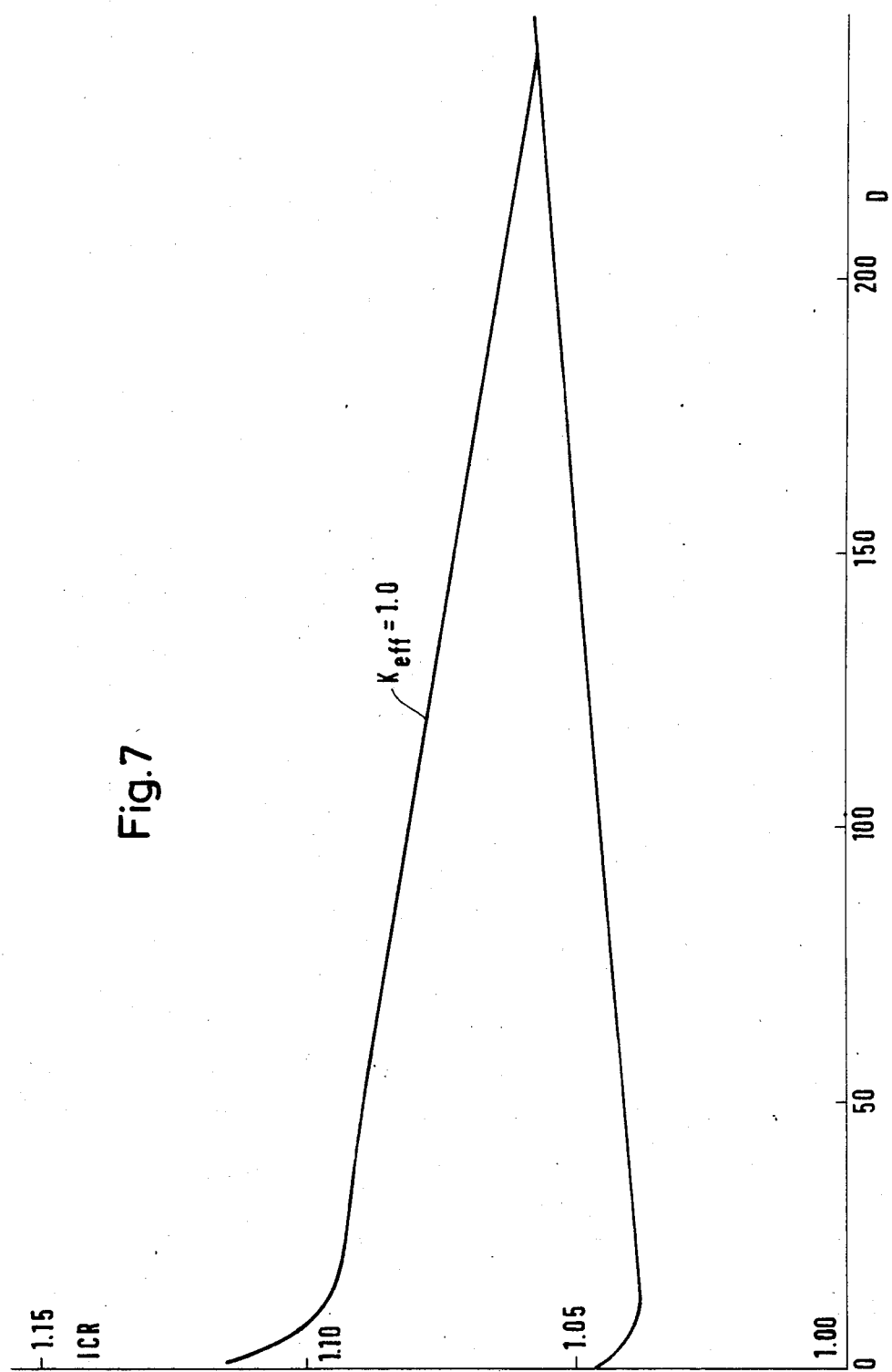

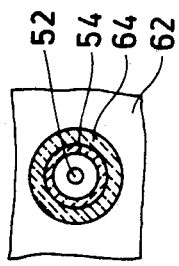
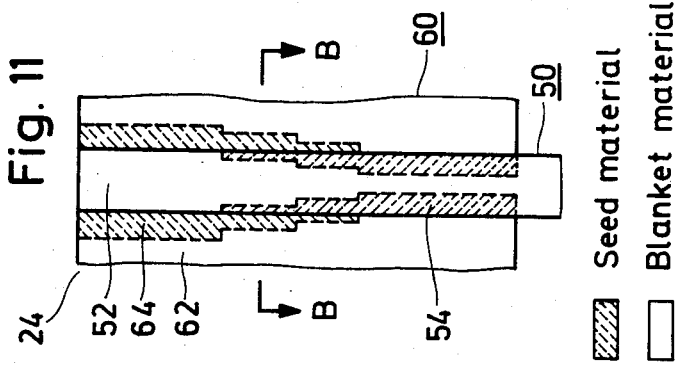
Fig. 11a
Fig. 11
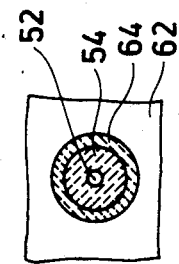
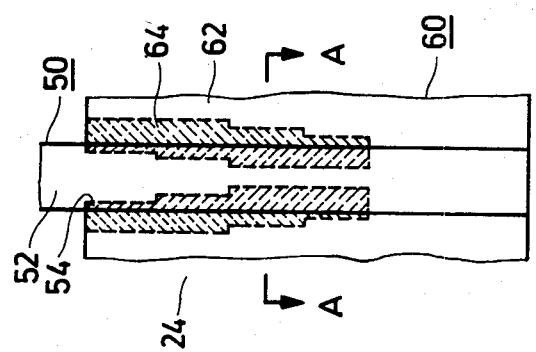
Fig. 10a
Fig. 10
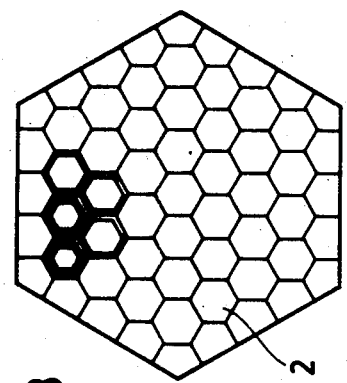
Fig. 8
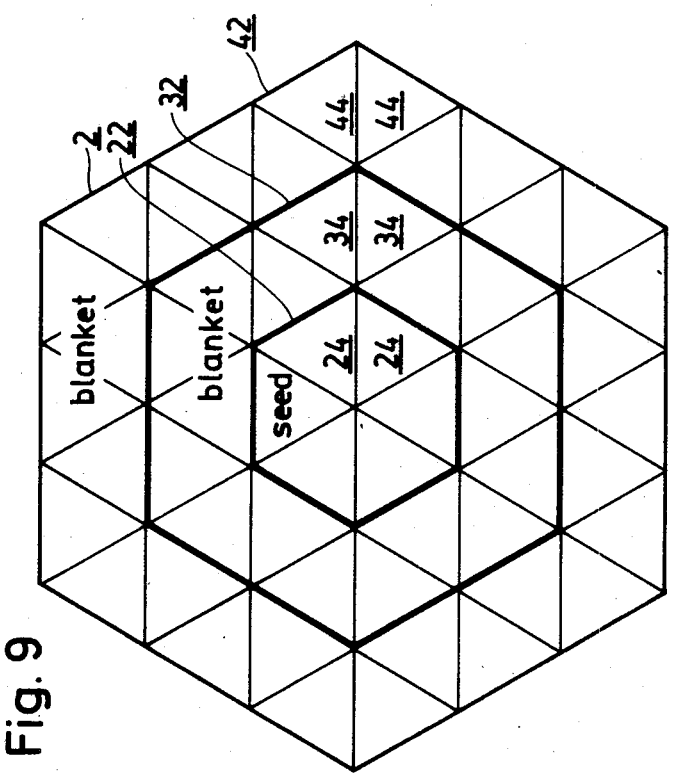
Fig. 9

NUCLEAR REACTOR

BACKGROUND OF THE INVENTION

The present invention relates to a nuclear reactor for producing energy which reactor contains seed zones and blanket zones and is cooled with pressurized water; both the zones containing fissile material of plutonium and fertile material.

U.S. Pat. No. 3,154,471 discloses a pressurized water reactor designed according to the seed zone blanket zone concept, which includes subcritical blanket zones with a low concentration of fissile to fertile material and seed zones with a high concentration of fissile to fertile material. The fissile material employed is one of the elements $U^{235}$, $U^{239}$, Pu239, $Pu^{241}$ or a combination of isotopes that can be split with thermal neutrons. The fertile material is $Th^{232}$ or $U^{238}$. The fertile material is $Th^{232}$ or $U^{238}$.

The attainment of a breeding rate exceeding 1 for thermal breeding with the use of plutonium obtained from light water reactors has not heretofore seemed possible to those skilled in the art, since, on the one hand, the number of fission neutrons per neutron absorbed in the fissile material (eta value $\eta$) for plutonium$^{239}$ is not high enough and, on the other hand, the simultaneously produced plutonium$^{240}$ known to be a high neutron absorber. The plutonium from light water reactors was therefore considered to be usable with good breeding ratios only in fast breeders.

Breeding in thermal reactors moreover seemed possible only in the thorium cycle. This conclusion was drawn from the eta values of the conventional fission materials at 0.025 eV, which values are: 2.3 for $U^{233}$; 2.077 for $U^{235}$; and 2.109 for Pu239. Since the eta value should lie above 2 to permit breeding, the attainable range with $U^{235}$ and $Pu^{239}$ was considered to be too small.

SUMMARY OF THE INVENTION

It is an object of the invention to achieve breeding in reactors of the above-mentioned type on the uranium-plutonium cycle. The invention is based on the discovery, which was that much more surprising in view of the above observations, that in a nuclear reactor of the above-mentioned type a breeding rate of greater than 1 can be produced if, according to the present invention, fissile material is added to both zones; the plutonium composition is such as that obtained from light water power plant reactors after a normal service life and recycle, and the geometry of the fuel elements of the seed and blanket zones with respect to coolant water is selected so that an epithermal neutron spectrum is produced. Normal service life is understood to mean, for example, 35,000 MWD/to (megawatt days per ton).

According to preferred embodiments of the invention, plutonium is present in the seed zones in a weight percent range of 14 to 8 and in the blanket zones in a weight percent range of 2 to 6.

BRIEF DESCRIPTION OF THE DRAWINGS

FIGS. 1a and 1b are curves of the eta values of vaious isotopes as a function of neutron energy, in electron volts, for two successive neutron energy ranges.

FIGS. 2–7 are performance curves illustrating the operation of reactors according to the invention.

FIG. 8 is a section of the complete core.

FIG. 9 shows one of the unit subassemblies.

FIGS. 10, 10a, 11 and 11a show the construction of the elements in the see region.

DESCRIPTION OF THE PREFERRED EMBODIMENTS

The starting point of the present invention is, in principle, the technical concept of the pressurized water reactor disclosed in U.S. Pat. No. 3,154,471, which is trimmed and regulated by movement of fuel.

Figure 1B:
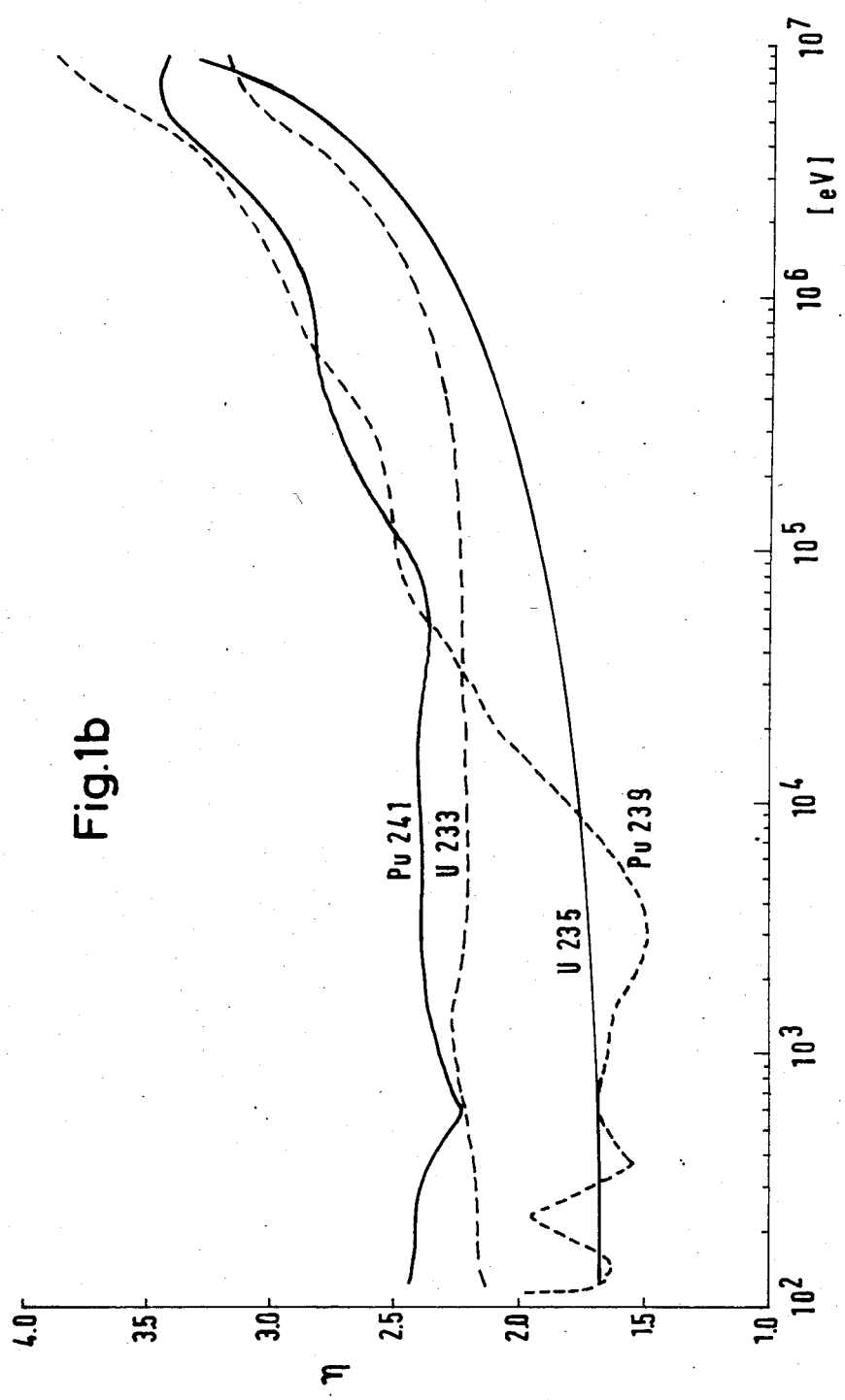

Even in thermal reactors, a large portion of the neutrons which produce the fission processes lies in the epithermal energy range. FIGS. 1a and 1b show the eta values for various isotopes plotted as a function of the neutron energy in electron-volts. As can be seen, $U^{235}$ and $Pu^{239}$ exhibit. very distinct dips in the eta values just above the thermal range. Table 1 shows the eta value at 0.025 eV as well as the eta values in the thermal and epithermal ranges, for $U^{233}$, $U^{235}$, $Pu^{239}$ and $Pu^{241}$.

TABLE 1

|  | U-233 | U-235 | Pu-239 | Pu-241 |
| --- | --- | --- | --- | --- |
| $\eta$ at (0.025 eV) | 2.30 | 2.07 | 2.11 | 2.15 |
| $\eta_{th}$ (typical PWR thermal spectrum) | 2.27 | 2.06 | 1.84 | 2.17 |
| $\eta_{epi}$ (typical PWR epithermal spectrum) | 2.16 | 1.67 | 1.88 | 2.49 |

FIG. 1a shows extremely sharp dips for the eta value for $U^{235}$ as well as for $Pu^{239}$ in the epithermal energy range.

Material that could be used for breeders can be obtained from light water nuclear power plant reactors. Such material for example, has a plutonium isotope composition of 55.23% $Pu^{239}$, 22.10% $Pu^{240}$, 17.68% $Pu^{241}$ and 4.97% $Pu^{242}$. Since the fission cross section of $Pu^{241}$ is greater than that of $Pu^{239}$, a relatively large portion of the fission processes takes place in $Pu^{241}$. Table 1 and FIG. 1 show that the eta value for $Pu^{241}$ is quite comparable to or greater than that of $U^{233}$.

Moreover, a U/Pu system has a number of advantages compared to a thorium system with reference to breeding. Thus, the fast fission effect is more than 5 times as great in $U^{238}$ as in thorium. It is therefore not very difficult to obtain a fast fission effect of 1.10 in a dense uranium grid structure. That means that for an eta value of approximately 2.1 in plutonium-239 the effective number of neutrons released per split plutonium nucleus rises from 2.1 to 2.31 and the number of neutrons that can be utilized for breeding rises from 0.1 to 0.31. Added to the latter figure should be 0.05 captures in $U^{238}$. Furthermore, $U^{238}$ produces more than 20% of all fission processes in the core with a fast fission effect of 1.10.

The total absorption effective cross section of the plutonium fission isotopes in the epithermal range is more than twice that of $U^{233}$. For that reason the absorption in the structure material is less relevant.

$Pu^{239}$ is formed relatively quickly from $U^{238}$, which has absorbed a neutron, while for thorium the protactinium transition has a half-life of 27.4 days. Protactinium has a relatively high effective cross section. Each absorption by protactinium is a double loss, the loss of the absorbed neutron and the loss of the $U^{233}$ that was then not formed.

Fission of $Pu^{240}$ is significant since the fission effective cross section of $Pu^{240}$ is six times greater than that of $U^{238}$. Moreover, $Pu^{240}$ has a noticeable fission effective cross section in the non-resolved resonance energy group, group 2, in which the flux is much greater than in the fast group, group 1. Groups 1, 2, 3 and 4 have energy ranges of 10 to 0.821 MeV, 821 to 5.53 keV, 5530 eV to 0.625 eV and 0.625 eV to 0 eV, respectively.

The above considerations have had the result, according to the present invention, that with a significant part of $Pu^{240}$ and $Pu^{241}$ in a plutonium fission material it is possible to breed, in a light water U-Pu system, more than easily as with $U^{233}$ in a U-Th system. In a nuclear reactor of the above-mentioned type, higher initial conversion rates (ICR) are found. Tables 2 and 3 and FIGS. 2, 3 and 4 will help to explain this.

TABLE 2

|  | Seed Zone | Blanket Zone |
|---|---|---|
| Moderator Volume/Fuel Material Volume, $\frac{V_M}{V_F}$ | 0.5 | 0.3 |
| % Pu | 12 | 2 |

ICR = 1.12 at $K_{eff}$ = 1

TABLE 3

|  | Seed Zone | Blanket Zone |
|---|---|---|
| $\frac{V_M}{V_F}$ | 0.5 | 0.3 |
| % Pu | 8 | 4 |

ICR = 1.10 at $K_{eff}$ = 1

Table 2 shows an ICR of 1.12 for the same design geometry as for a reactor operating in the U-Th cycle, i.e. a light water breeder reactor. The plutonium percentages lie at 12% in the seed zone and 2% in the blanket zone. Table 3 shows that for an 8% plutonium content in the seed zone and a 4% plutonium content in the blanket zone the ICR dropped to 1.10. In both cases the value of 0.5 for the seed zone and 0.3 for the blanket zone were assumed to exist for the ratio of $V_M/V_F$. In both cases, $K_{eff}$ equals 1. The power production in the blanket zone is higher in the second case.

Figure 3:
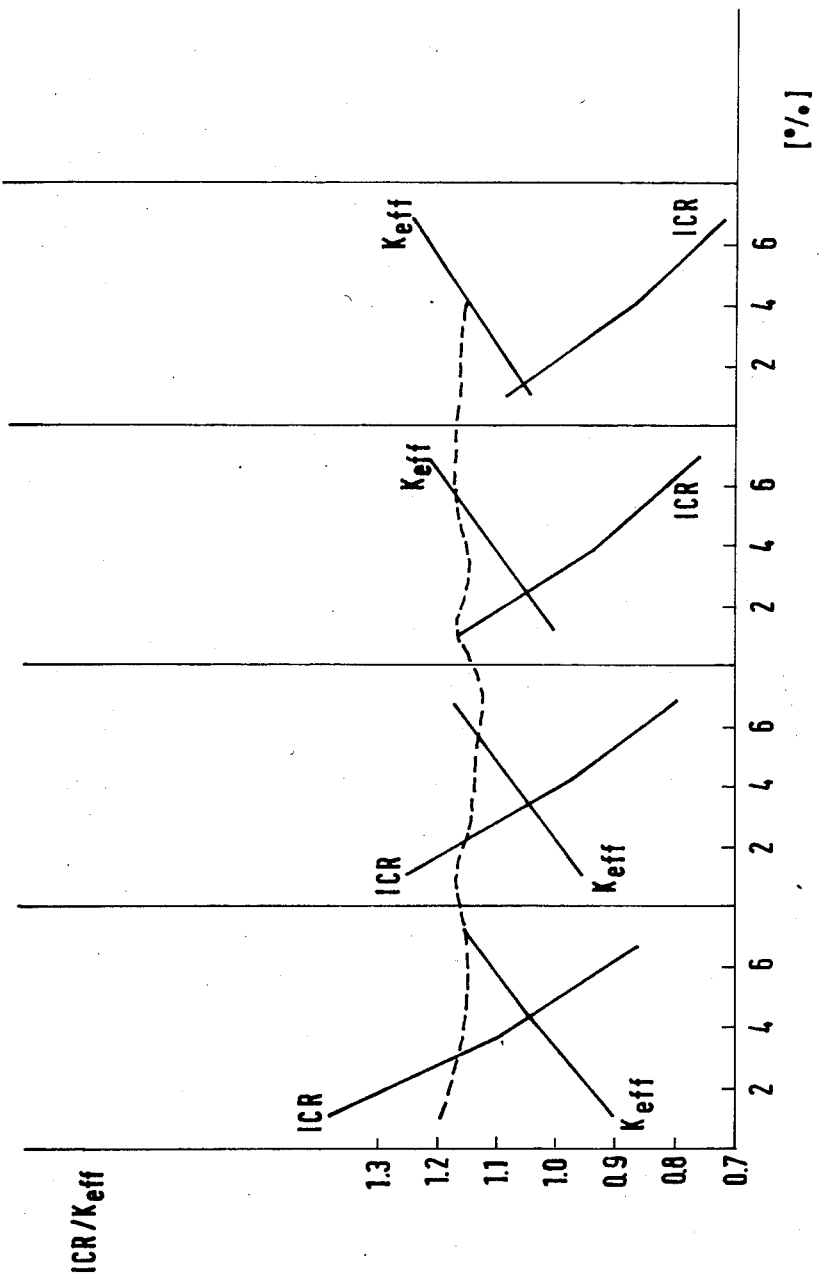

FIGS. 2 and 3 show, in solid lines, the behavior of ICR and $K_{eff}$ values, respectively, for other compositions, e.g. a seed zone enrichment of 8, 10, 12 and 14% plutonium and a blanket zone enrichment of 2, 4 and 6% plutonium. The volume ratio of zone to zone is 1.96. FIGS. 2 and 3 show that each percent of increase in $K_{eff}$ brings about a 2% reduction of the ICR.

Figure 4:
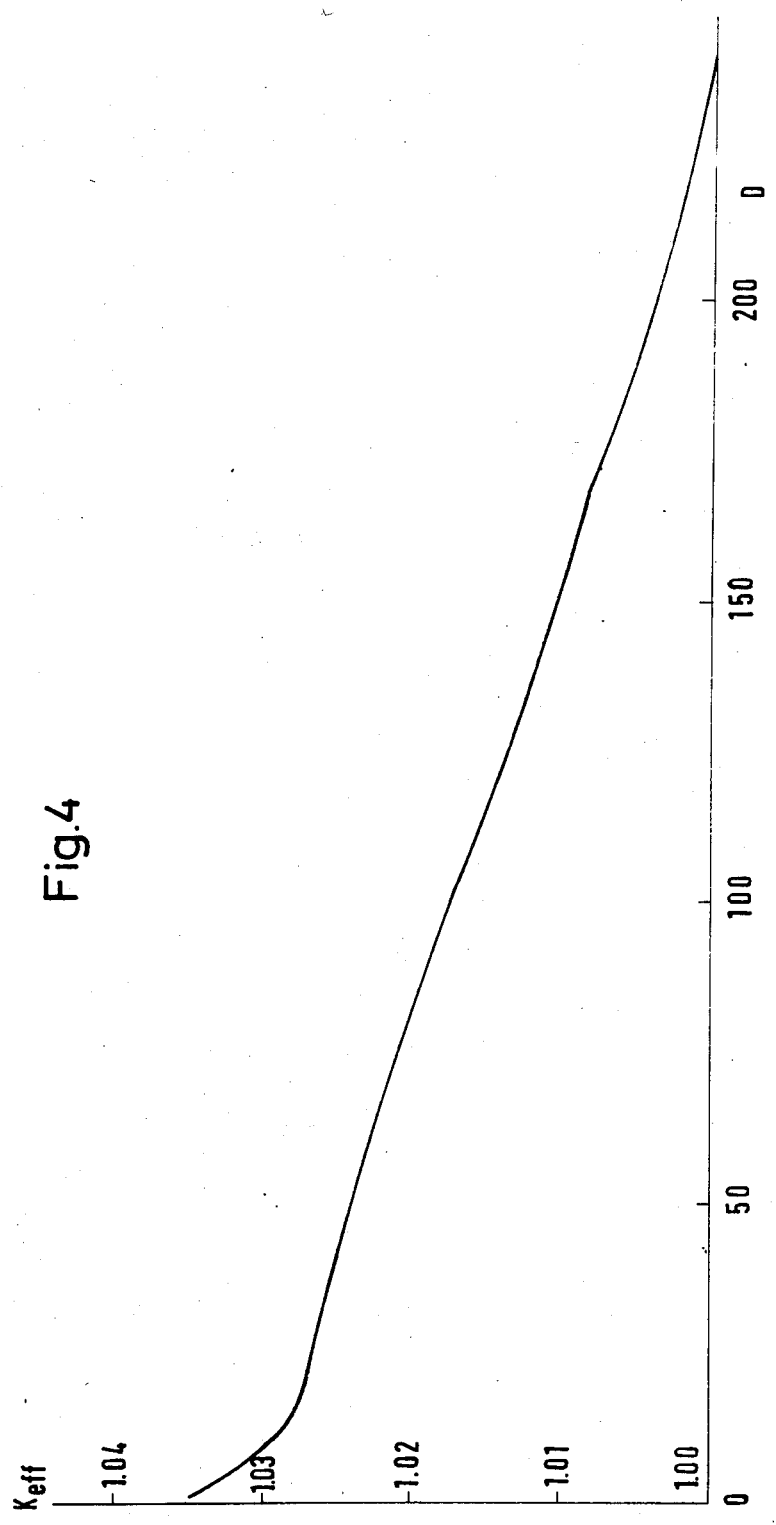

FIG. 4 shows the behavior of $K_{eff}$ as a function of core lifetime, in full-load days, D.

In the reactor employed, the seed zone is enriched to 12% plutonium with a $V_M/V_F$ ratio of 0.5 and the blanket zone to 2% plutonium with a $V_M/V_F$ ratio of 0.3. The radii for the seed and blanket zones are 13.90 and 22.90 cm, respectively. The average power density is 100 W/cm$^3$. The ICR value is relatively independent of the radius of the seed zones.

FIGS. 5 and 6 show the initial power distribution L and the flux distribution F, respectively, as functions of the radius, in cm, the transition between seed and blanket zones, being represented by a vertical line, where the seed zone has 12% Pu and $V_M/V_F=0.5$, and the blanket zone has 2% Pu and $V_M/V_F=0.3$. Optimization is obtained by improving the power distribution. Tables 4 through 6 show the initial absorption (ABS) and fission (FISS) rates in the seed and blanket zones. In the case of Table 4, the fuel radius is 0.411 cm; the thickness of the zirconium metal cladding is 0.60 mm.

TABLE 4

| Neutron Energy Group | Seed Zone | | | Blanket Zone | | |
|---|---|---|---|---|---|---|
|  | Fissle Material | Metal cladding | Water | Fissle Material | Metal cladding | Water |
| 1 | 9.73 | 0.102 | 8.90−2 | 8.19 | 0.116 | 5.912 |
| 2 | 16.96 | 0.170 | 1.07−4 | 16.82 | 0.267 | 1.05−4 |
| 3 | 65.54 | 1.03 | 7.55−2 | 60.73 | 1.84 | 0.113 |
| 4 | 6.27 | 4.56−3 | 1.76−2 | 11.78 | 2.67−2 | 5.55−2 |
| Total | 98.51 | 1.31 | 0.182 | 97.52 | 2.25 | 0.228 |

TABLE 5

| Neutron energy Group | Relative Flux | 238 $U_{ABS}$ | 238 $U_{FISS}$ | 239 $Pu_{ABS}$ | 240 $Pu_{ABS}$ | 240 $Pu_{FISS}$ | 241 Puphd ABS |
|---|---|---|---|---|---|---|---|
| 1 | 11.869 | 6.996−2 | 6.127−2 | 4.887−3 | 1.781−3 | 1.664−3 | 1.444−3 |
| 2 | 34.453 | 1.430−1 | 1.817−4 | 1.505−2 | 2.210−3 | 6.618−4 | 7.915−3 |
| 3 | 17.300 | 3.488−1 | 0 | 1.108−1 | 6.880−2 | 1.474−5 | 6.309−2 |
| 4 | 0.4287 | 6.068−3 | 0 | 8.538−2 | 7.248−3 | 1.176−6 | 1.905−2 |
| Total |  | 5.678−1 | 6.145−2 | 2.161 | 8.004−2 | 2.342−3 | 9.1 |

TABLE 6

| Neutron energy Group | Relative Flux | 238 $U_{ABS}$ | 238 $U_{FISS}$ | 239 $Pu_{ABS}$ | 240 $Pu_{ABS}$ | 240 $Pu_{FISS}$ | 241 $Pu_{ABS}$ |
|---|---|---|---|---|---|---|---|
| 1 | 11.376 | 5.223−2 | 4.626−2 | 2.508−2 | 9.131−3 | 8.553−3 | 7.403−3 |
| 2 | 24.263 | 7.574−2 | 1.051−4 | 5.631−2 | 8.330−3 | 2.625−3 | 2.926−2 |
| 3 | 10.075 | 1.782−1 | 0 | 2.318−1 | 6.175−2 | 1.146−5 | 1.609−1 |
| 4 | 0.07434 | 5.411−4 | 0 | 4.674−2 | 5.254−3 | 8.541−7 | 1.014−2 |
| Total |  | 3.067−1 | 4.636−2 | 3.599−1 | 8.446−2 | 1.119−2 | 2.077−1 |

FIG. 7 illustrates ICR as a function of fuel consumption, full-load days D. The geometry was varied to produce $K_{eff}=1$. The ICR value for the total burn-up here remains above one, even up to 500 full load days. This result was obtained by extrapolation.

FIG. 7 shows that after 250 full load days the excess reactivity is spent, which can be prevented, however, if the radius of the seed zones is enlarged somewhat. This would not influence the ICR value.

It is clear that $Pu^{239}$ has an adverse effect on the breeding effect. The ICR value, however, grows with increasing percentage of $Pu^{240}$ and $Pu^{241}$ and thus the reactivity increases as well. If a pure Pu$^{240}$/Pu$^{241}$ fissile material were present, the resulting ICR value could go above 1.30. This would have the following advantages: the proportion of U$^{238}$ in the fissile zone would be reduced; the fissile material inventory would be reduced; the water content of the seed zones could be increased, which would facilitate cooling; and the burn-up would be increased.

An important parameter of the nuclear reactor is its void coefficient. Calculations have shown that for a light water uranium-plutonium breeder the void coefficient is highly negative, e.g. $\delta K/K/\delta\rho/\rho = -0.048$ where $\rho$ equals the density of water in the seed zone. This value has been derived from Table 7, below.

TABLE 7

| $\delta\rho/\rho$ | $K_{eff}$ |
|---|---|
| 0.0 | 1.034 |
| 0.4 (10% loss of water) | 1.029 |
| 0.5 | 1.02 |
| 1.0 | 0.925 |

As previously mentioned, the reactor core is composed of unit subassemblies, each containing a seed zone and blanket zone. FIG. 8 represents a section of the complete core and FIG. 9 shows one of the unit subassemblies.

An essential characteristic of the design is geometry control.

The core is controlled by vertically moving sections of the elements 24 in the seed region 22, which effects a change in the seed geometry to vary the number of neutrons leaking into the blanket 42. FIGS. 10 and 11 illustrate the construction of the elements in the seed region 22 to enable this "geometry control" to be effected. While the elements in the seed region are in the form of rods, as described above, the "geometry control" in FIGS. 10 and 11 is illustrated in a simplified manner in which the complete seed region is represented as an equivalent cylinder.

Thus, the rods in the seed region 22 are arranged to define an inner section 50 and an outer annular section 60, one section being relatively displaceable with respect to the other in a vertical direction; in this case, the inner section 50 is vertically displaceable with respect to the outer annular section 60, as shown in FIG. 11. The inner section 50 has a center 52 of blanket material, and an outer boundary layer or region 54 of both blanket material and seed material. The outer annular section 60 has an outer layer or region 62 of blanket material, and an inner boundary layer or region 64 of both blanket material and seed uranium.

As shown in FIG. 10, the seed material portions in both boundary layers 54 and 64 are of stepped unequal thicknesses and are arranged such that the vertical displacement of one section (section 50) with respect to the other (section 60) varies the effective combined thicknesses of the seed material through both layers, and thereby the degree of leakage of the neutrons from the seed material in the seed region 22 to the blanket materials in the blanket regions 32 and 42. Thus, FIG. 10 illustrates the "low leakage" position of the inner seed section 50 with respect to the outer section 60, wherein the combined thicknesses of the seed material in the two boundary layers 54, 64 is highest. FIG. 11 illustrates the "high leakage" position of these two sections, wherein the lowering of the inner movable seed section 50 has made the combined seed material thicknesses in the two boundary layers thinner and longer, thereby increasing the leakage of neutrons from the seed regions to the blanket regions, reducing core reactivity.

Actually, each of the seed material region containing elements 24, as well as the blanket-material containing elements 34 and 44 in the two blanket regions, 32, 42, is made up of a plurality of rods as well known and as described in the above-cited patent. The blanket material and the seed material may easily be provided in the rods of the two boundary layers 54, 64, by building up the rods with segments of these two types of materials.

The above described geometry control is preferable to the spectral shift control for several reasons: First, no heavy water is required, thereby obviating the large capital costs for providing heavy water and the many expensive plant precautions to minimize effects of leakage. In addition, this geometry control conserves neutrons for reactivity changes due to power changes, as well as to depletion. This is in contrast to the spectral shift control which requires poison control for power changes. Moreover, dilution of heavy water cannot be readily reversed, which results in waste of neutrons.

It will be understood that the above description of the present invention is susceptible to various modifications, changes and adaptations, and the same are intended to be comprehended within the meaning and range of equivalents of the appended claims.

What is claimed is:

1. An epithermal nuclear breeder reactor comprising an active core and means containing a body of pressurized water as a moderator for cooling said core, wherein: said core is composed of a plurality of unit subassemblies each composed of a seed region with moderator to fuel volume ratio of the order of 0.5 and a blanket region with moderator to fuel volume ratio of the order of 0.3, each said region comprising fuel rods of fissile and fertile materials; each said fuel rod in said region is composed of two parts which are configured and movable relative to one another in a manner to vary the number of neutrons leaking from said seed region into said blanket region; said fissile material comprises plutonium having an initial isotope composition such that the ratio of Pu$^{241}$ to Pu$^{239}$ is of the order of 30% and the ratio of Pu$^{240}$ to Pu$^{239}$ is of the order of 40%, said fertile material comprises U$^{238}$; said seed region contains plutonium in a concentration of 8 to 14%, by weight; and said blanket region contains plutonium in a concentration of 2 to 6%, by weight.

* * * * *